May 28, 1957 C. K. BAREFOOT 2,793,397
CENTERING MEANS FOR TIRE RETREADING MACHINES
Filed Sept. 13, 1956 2 Sheets-Sheet 1
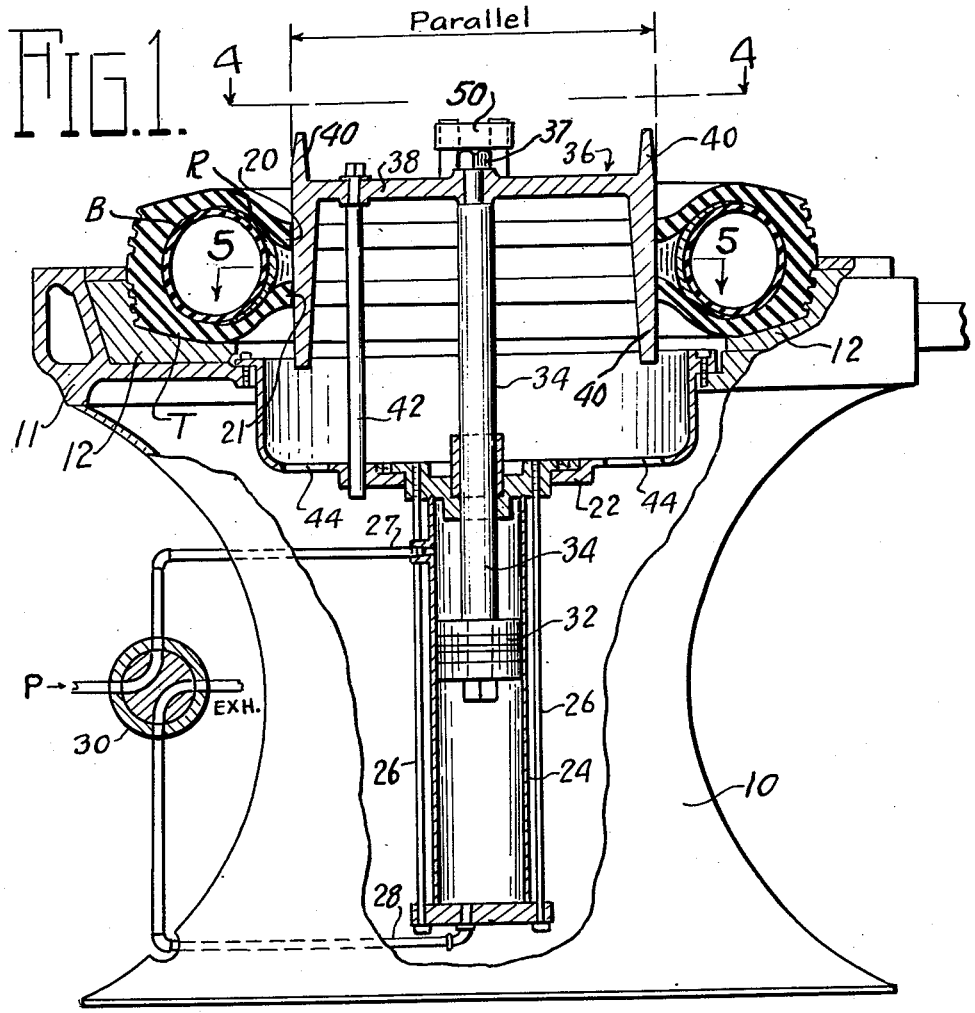
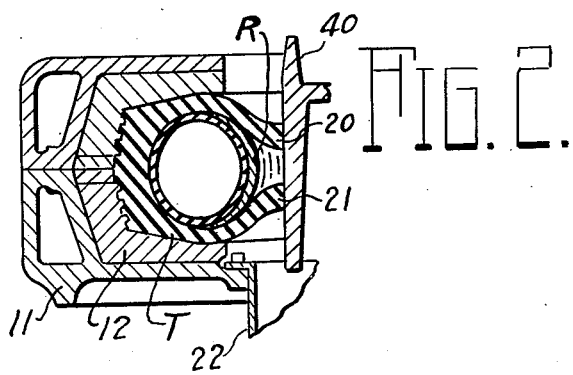
INVENTOR.
Carlton Keith Barefoot
BY
ATTORNEYS May 28, 1957 C. K. BAREFOOT 2,793,397
CENTERING MEANS FOR TIRE RETREADING MACHINES
Filed Sept. 13, 1956 2 Sheets-Sheet 2
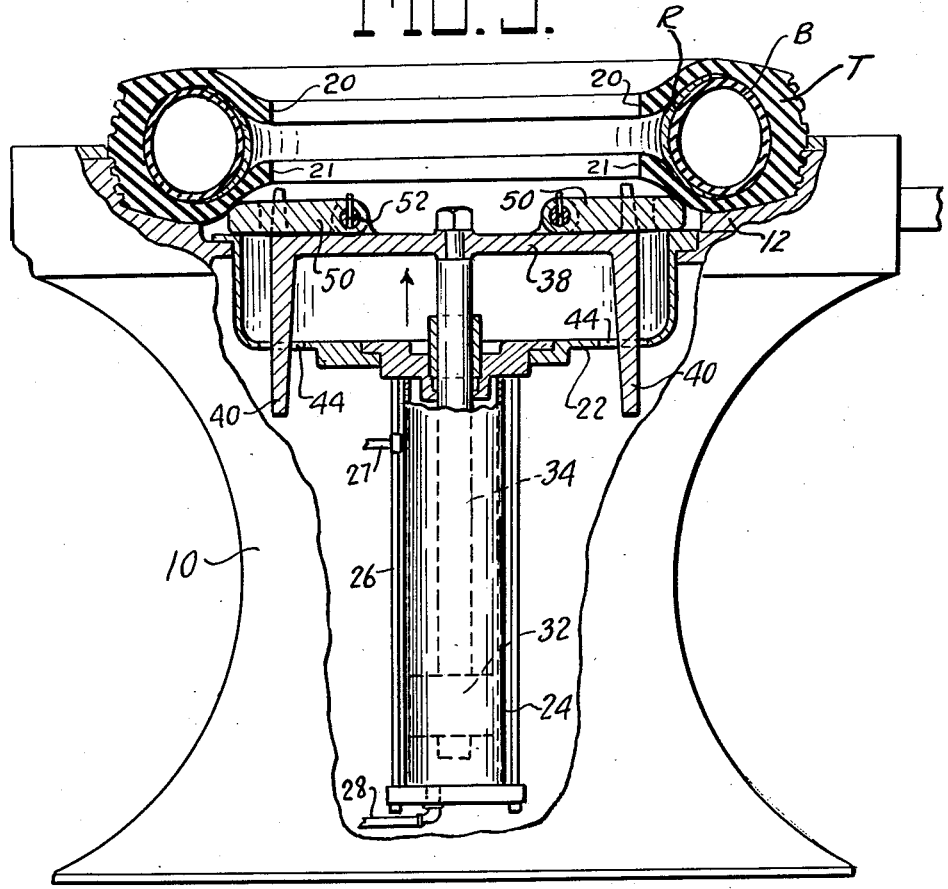
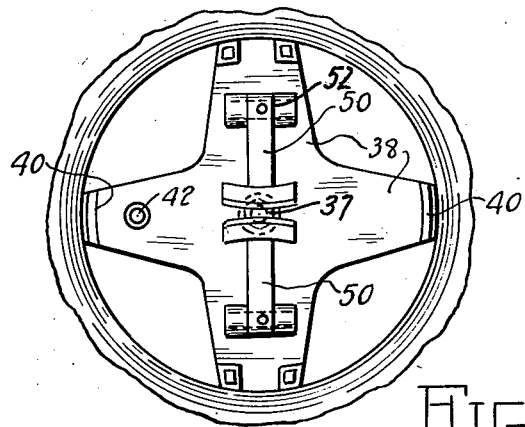
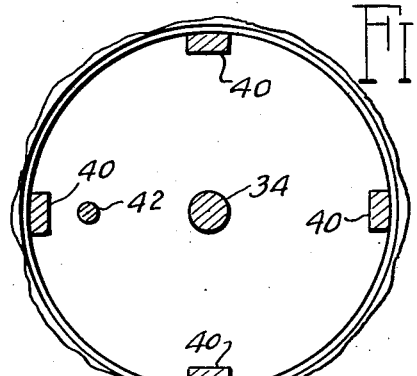
INVENTOR.
Carlton Keith Barefoot
BY
ATTORNEYS

United States Patent Office 2,793,397
Patented May 28, 1957

2,793,397

CENTERING MEANS FOR TIRE RETREADING MACHINES

Carlton Keith Barefoot, Muncie, Ind., assignor to National Industries, Inc., Muncie, Ind., a corporation of Indiana Application September 13, 1956, Serial No. 609,724

5 Claims. (Cl. 18—18)

This invention relates to machines for retreading tires, and is particularly directed to a centering means for such machines.

When a tire carcass is to be retreaded, it is first properly prepared by removing the old tread surface to a predetermined line and positioning an encircling band of new stock over the prepared surface. The assemblage is then inserted into a mold in which the new material is vulcanized in place and given a desired tread pattern. It is, of course, very important that the unvulcanized assemblage be centered in the mold and bear with equal pressure against the entire mold periphery, and that the bead surfaces of the tire be free to accommodate themselves to the proper position so that the mid-plane of the finished, vulcanized tire coincides exactly with the same plane of the original tire. The present invention has for its primary object to provide a means which will assure very accurate centering of the above-mentioned tire assemblage in a mold, and which will accomplish its end without impeding the accommodating motion required of the bead surfaces.

Another object of the invention is to provide a centering means which can also function as an ejection device for a completed tire.

Still another object of the invention is to provide a centering means which is self contained so that it can be installed in existing tire retreading or molding machines.

Other objects and advantages of the invention will become apparent from the following detailed description of a preferred embodiment thereof, reference being had to the accompanying drawings, in which—

Fig. 1 is a central vertical sectional view of a centering means according to the present invention, shown in conjunction with a diagrammatically indicated tire mold and tire;

Fig. 2 is a fragmentary sectional view of a tire in a closed retreading mold with the centering means of the present invention fragmentarily shown in the position it occupies during vulcanization of a tire;

Fig. 3 is a view similar to Fig. 1 with the centering means shown in a position in which it is ready to act as an ejector for a completed tire;

Fig. 4 is a top plan view of the centering means, taken on line 4—4 of Fig. 1; and Fig. 5 is a section on line 5—5 of Fig. 1.

Referring to the drawings, a preferred embodiment of the invention is shown installed in a tire molding machine comprising a base 10 in the upper portion of which is mounted a lower mold half 11 which is heated in any suitable manner. The lower mold half receives a matrix section 12 which imparts a selected tread design to the completed tire and is therefore replaceable in the mold, being held therein by any convenient means. The mold shown in the drawings is of the well known "clam shell" type, but the present invention would be equally usable with molds of other types in which centering of an unvulcanized tire assemblage in the mold is a problem.

A tire is diagrammatically indicated at T in the drawings, and no attempt has been made to delineate the original carcass and applied retreading material. As is conventional, this assemblage is held outwardly under pressure during curing by an inflated tube or bag B, backed at the inside by a curing rim R in a manner known in the art. The bead portions of the tire are designated 20 and 21.

The centering means of the present invention comprises a bowl-like support 22 from which depends an elevating cylinder 24, fixed in place in any suitable manner as by tie rods 26. The cylinder 24 is double acting and thus has upper and lower fluid connections 27 and 28. Any desired valving may be used to conduct fluid under pressure to the double acting cylinder 24 and a conventional 4-way valve 30 is shown in the drawings. It will become apparent from the subsequent description of the operation of the present invention that it is only necessary that the operator be enabled to raise and lower the movable portions of the centering means at will.

A piston 32 is provided within the cylinder 24, and is connected by means of a piston rod 34 to a spider 36. Spider 36 is removably retained on the rod 34 by a nut 37 and comprises a plurality of radiating arms 38, four in the present instance, each of which carries at its end a vertically disposed guide member 40, which in use, engages the bead surfaces 20 and 21 of a tire. Each guide member 40 is tapered inwardly at its upper end to facilitate entry of the several members into a tire, and below the tapered ends, the outer surfaces are parallel to each other and perpendicular to the radial plane of a tire.

The spider 36 and guide members 40 are reciprocated when desired by piston 32, and are guided by a pin 42 depending from one of the arms 38 and extending through an opening in the bowl 22. The bowl is further provided with openings 44 through which the lower ends of the guide members 40 may pass when the spider is lowered as hereinafter described.

As best shown in Figs. 3 and 4 two diametrically opposite spider arms 38 are provided with retractable tire ejecting means comprising T-shaped links 50 pivoted at 52. In one position, as shown in Fig. 4, the links are so disposed that the circumferential portion of the T overlies its supporting arm 38, while in the other position, as shown in Fig. 3, the links may be swung out around their pivots so that the heads of the T shape underlie a tire in the mold at diametrically spaced points.

In operation, assuming that it is desired to load a tire assemblage into a mold for curing or vulcanization, pressure is applied to cylinder 24 to raise piston 32 and the spider to the upper position shown in Fig. 1. A lubricant such as dilute soap is applied to the outer surfaces of the guide members 40, and a tire assemblage may then be easily loaded over the four guide members and pressed downwardly into the lower mold half. It will be seen that the bead surfaces 20 and 21 are in contact with the guide members and that the tire is accurately centered in the mold by reason of this engagement. In most prior machines of a similar nature the tire assemblage is centered only by reason of its outer periphery engaging the adjacent matrix surfaces, whereas in the present invention the tire assemblage is located by engagement of the bead surfaces 20 and 21 with the guide arms 40.

With the tire assemblage in the lower mold half and properly located, the mold may be closed and a conventional curing cycle carried out. Upon completion of the curing cycle the mold my be opened and it will be found that the completed tire strips easily from the upper mold half because any tendency of the tire to follow the slightly swinging movement of the upper mold half away from the stationary lower mold is resisted by the guide members 40.

When the mold is opened, pressure is applied to the upper end of cylinder 24 above the piston 32 by moving the appropriate valve. The piston is thus lowered in the cylinder and the spider is carried downwardly to the extent that its upper plane is well below the adjacent surfaces of the completed tire. The operator then reaches in and swings the T-shaped ejector links 50 outwardly so that they underlie the tire walls. He then vents the upper end of cylinder 24 and introduces pressure into the lower end, beneath piston 32. In so doing the parts are brought into the position shown in Fig. 3 in which the ejector links are in contact with the lower walls of the tire, and continued upward movement of the spider will strip the tire from the lower mold half and raise it entirely out of the mold. The tire is then removed and the ejector links 50 are swung back to retracted position, after which the centering means is ready to receive another tire assemblage.

The present invention is readily installed on many types of existing tire molds in which the center area is relatively free and unencumbered. It is only necessary to properly center the bowl support 22 with reference to the periphery of the mold and to fasten it in place; after which the desired air or oil connections can be made to the operating cylinder 24. Once the installation is complete, various size spiders 36 can be attached to the piston rod 34 merely by removing nut 37. For example, if the machine has been used to retread tires having a 15 inch rim diameter, and must be modified to accommodate a tire having a 14 inch or 16 inch rim diameter, the spider can be replaced with the proper size unit in a very short time.

While the invention has been disclosed in conjunction with a specific form and disposition of the parts, it will be expressly understood that the disclosure is illustrative of a preferred embodiment and that numerous modifications and changes may be made without departing from the scope of the appended claims.

What I claim is:

1. In combination with a tire retreading mold, a tire centering means comprising a support centered with respect to the mold periphery, a plurality of guide fingers extending perpendicular to the radial plane of the mold and equally spaced with respect to the center thereof, and means carried by said support to raise and lower said guide fingers as a unit, said guide fingers being accurately spaced to engage the bead surfaces of a tire in the mold.

2. In combination with a tire retreading mold, a tire centering means comprising a spider having a plurality of radially extending arms, a guide finger at the end of each arm extending perpendicular to the radial plane of the mold and equally spaced with respect to the center thereof, means to raise and lower said spider and guide fingers as a unit, said guide fingers being accurately spaced to engage the bead surfaces of a tire in the mold whereby said tire is centered with reference to its bead surfaces.

3. A device in accordance with claim 2 in which said guide fingers are tapered at the ends first engaging a tire placed thereover.

4. In combination with a tire retreading mold, a tire centering means comprising a spider having a plurality of radially extending arms, a guide finger at the end of each arm extending perpendicular to the radial plane of the mold and equally spaced with respect to the center thereof, retractable tire ejecting links carried by certain of said arms and lying within the periphery of said spider in one position and extending beyond the periphery of said spider in another position, means to lower said spider below the plane of said tire to an extent whereby said ejecting links may be extended to underlie adjacent tire surfaces, means to raise said spider with said links extended and thereby eject a completed tire from the mold, said guide fingers being accurately spaced to engage the bead surfaces of a tire in the mold whereby said tire is centered with reference to its bead surfaces.

5. The combination defined in claim 4 in which said ejecting links are pivotally carried by said spider arms.

References Cited in the file of this patent

UNITED STATES PATENTS

| | | |
|---|---|---|
| 2,422,788 | Kraft | June 24, 1947 |
| 2,683,898 | Glynn | July 20, 1954 |
| 2,728,945 | Clapp | Jan. 3, 1956 |